March 13, 1934.    R. STRAUMANN    1,950,867
PIVOT BEARING FOR CLOCKS, WATCHES, AND OTHER PRECISION INSTRUMENTS
Filed Sept. 9, 1933
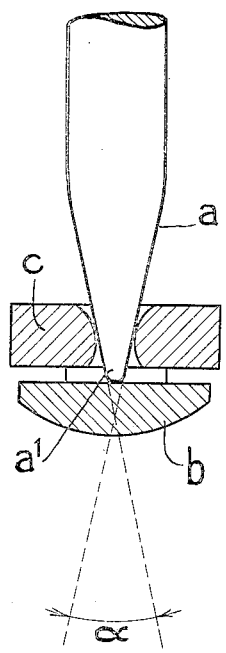
Inventor:
R. Straumann
By E. F. Wenderoth
Atty Patented Mar. 13, 1934

1,950,867

UNITED STATES PATENT OFFICE 1,950,867

PIVOT BEARING FOR CLOCKS, WATCHES, AND OTHER PRECISION INSTRUMENTS

Reinhard Straumann, Waldenburg, near Basel, Switzerland, assignor to the firm Fabriques d'Horlogerie Thommen S. A., Waldenburg, near Basel, Switzerland Application September 9, 1933, Serial No. 688,855
In Switzerland October 11, 1932

1 Claim. (Cl. 308—159)

The present invention relates to a bearing arrangement for shock-proof clocks, watches and other precision instruments, comprising a pivot and bearing.

It is known in watches to support a conical pivot by a pierced stone and cover jewel. A slim form of pivot is also known per se. To increase the resistance to shocks the staff bearings are often resiliently supported so that upon the occurrence of shocks the bearing and the cover plate can yield. Abutments are then provided in the bearing construction so that when the staff is thrown out of its normal position by a shock, the thicker part of the staff strikes the abutments radially or axially as the case may be, thus taking the shock while the delicate pivots remain undamaged.

According to the invention the same effect is obtained in a simple manner by forming the pivot over its whole length up to the end so that it shows in cross section a substantially equal bending resistance over its whole length, the end of the pivot running against a cover plate and the pivot being radially supported further back in a neck bearing.

A type of bearing wherein the point of a conical pivot runs in a rounded bearing recess is known in cheap watches and alarm clocks. This form of bearing cannot be used however in precision watches or precision instruments owing to irregular running.

The drawing illustrates an embodiment of the present invention.

The pivot $a$ is made conical over its whole length, with a small apical angle $\alpha$, so that its form has a cross section of substantially constant bending resistance over its whole length. The end $a'$ of the pivot $a$ runs against the cover plate $b$. At a point further back the pivot $a$ is radially supported in a neck bearing $c$. This bearing arrangement has the advantage that when the pivot receives a dangerous shock, it undergoes a deformation or bending distributed over its whole length, whereby the risk of breakage is reduced to the very minimum, in so far as a watch can continue to run without noticeable irregularity with a slightly bent pivot.

By way of example, according to the position of the point of support in the neck bearing $c$ with a given diameter, the angle $\alpha$ will lie between 10° and 20°. An angle $\alpha$ of 15° has been found particularly advantageous. With angles above 20° the straight sides of the pivot as they are in practice deviate too far from the cubical parabola which defines the form of constant bending resistance so that dangerous cross sections liable to fracture may occur.

What I claim is:—

A bearing arrangement for shock proof clocks, watches and other precision instruments, comprising a pivot and bearing, characterized in that the pivot is made over its whole length of substantially constant bending resistance, and, while its end runs against a cover plate, is radially supported at a point further back in a neck bearing.

REINHARD STRAUMANN.